Nov. 12, 1963
C. W. LOFTIN
3,110,515
VEHICLE BODY-FENDER STRUCTURE
Filed Nov. 10, 1959
3 Sheets-Sheet 3
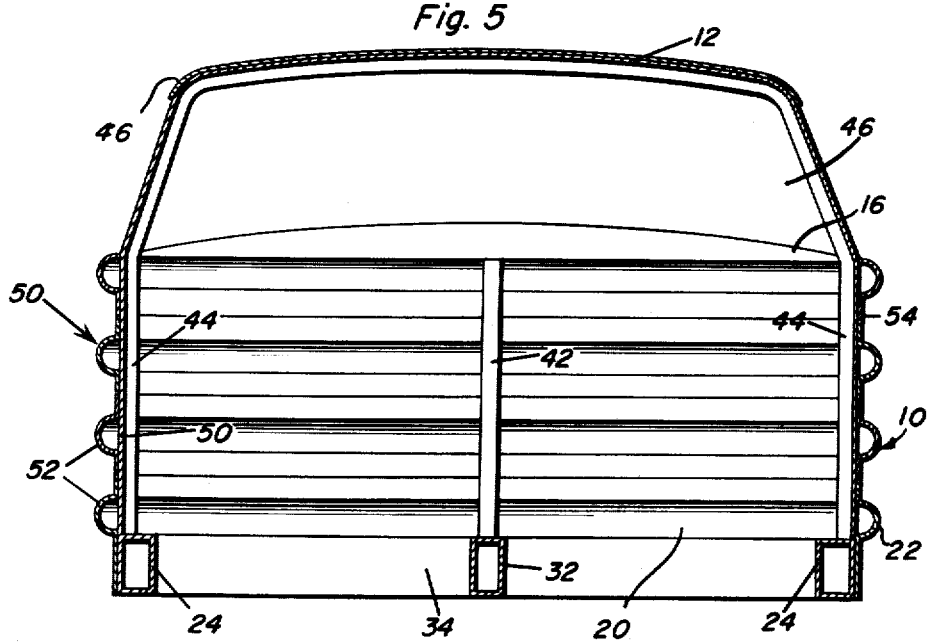
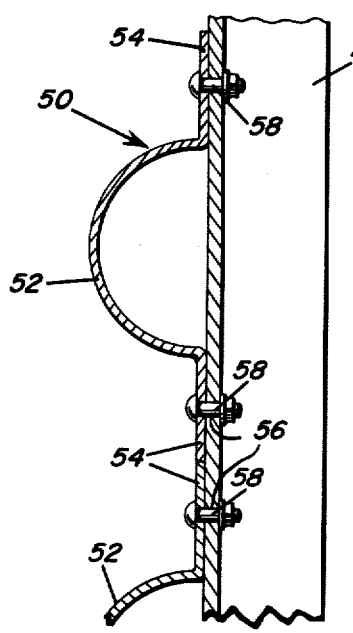
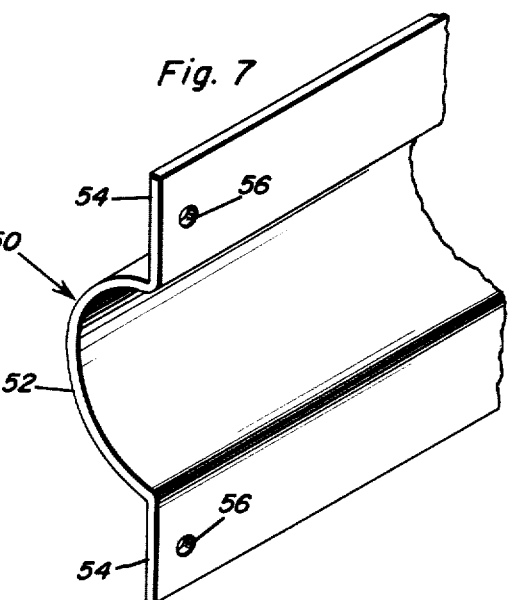
Clifford W. Loftin
INVENTOR.

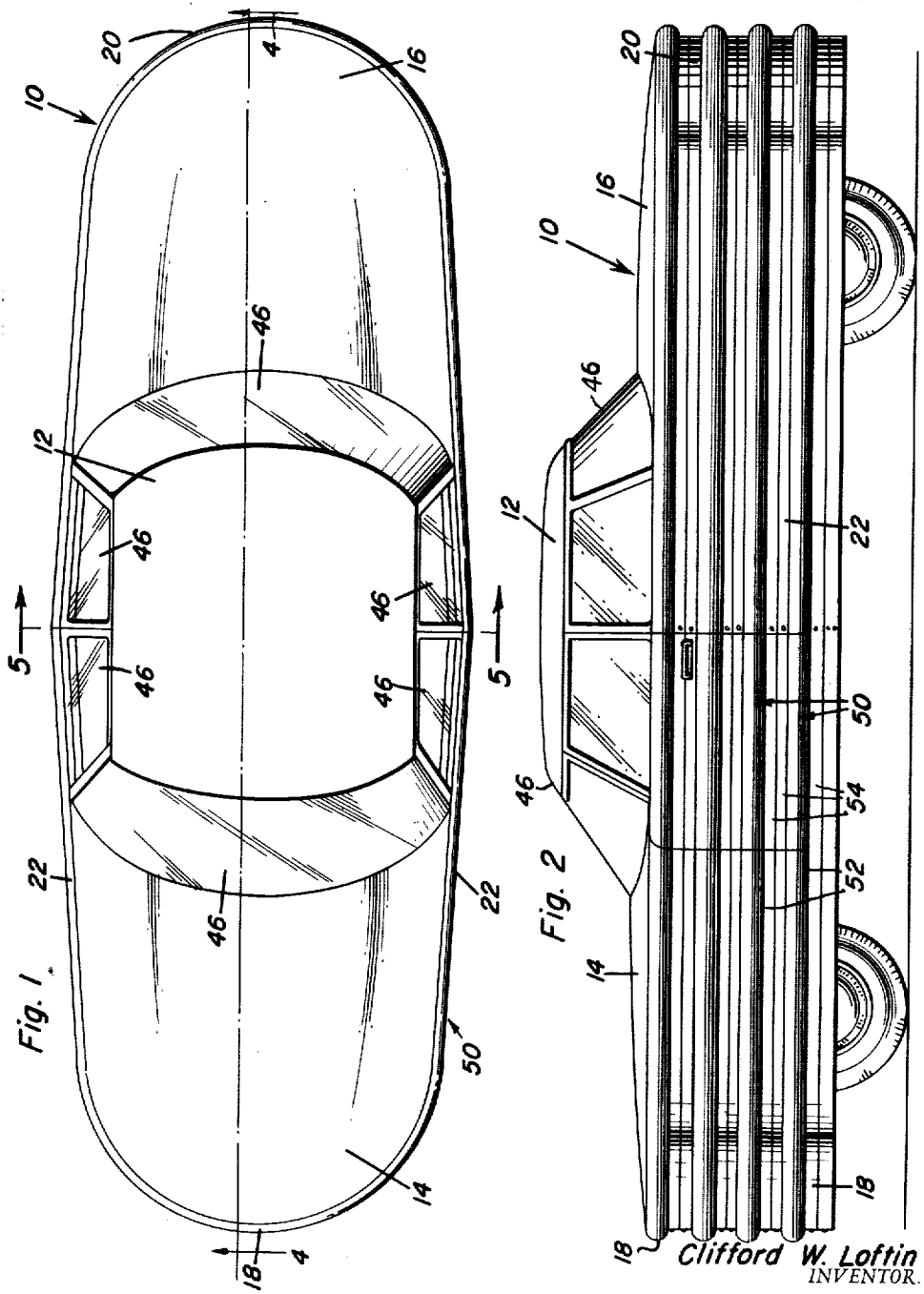

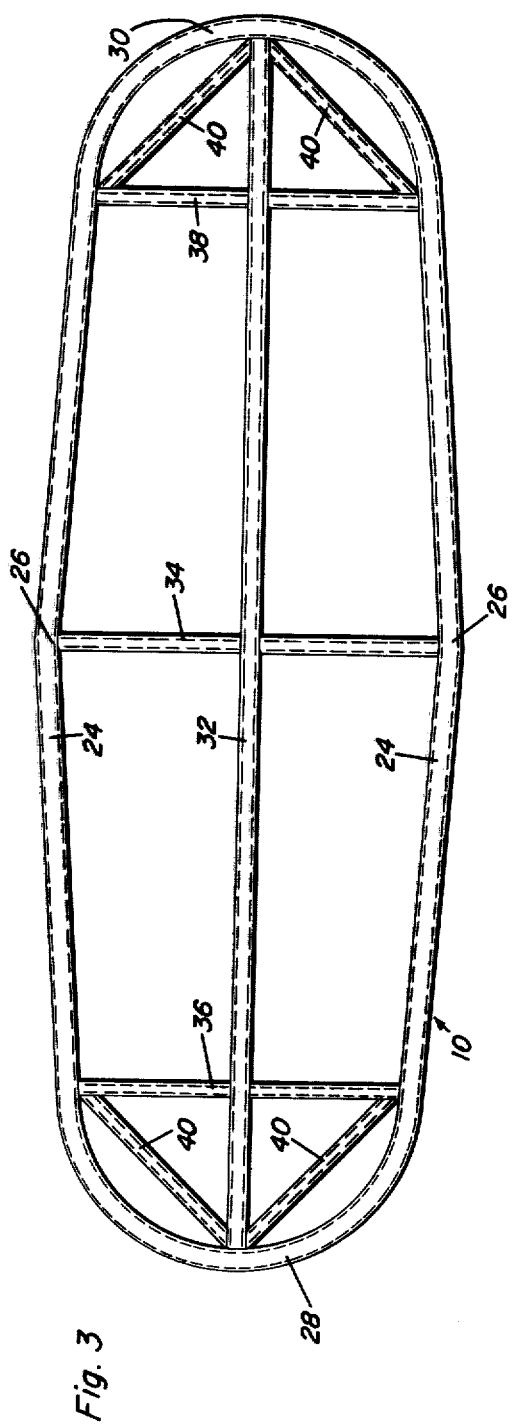
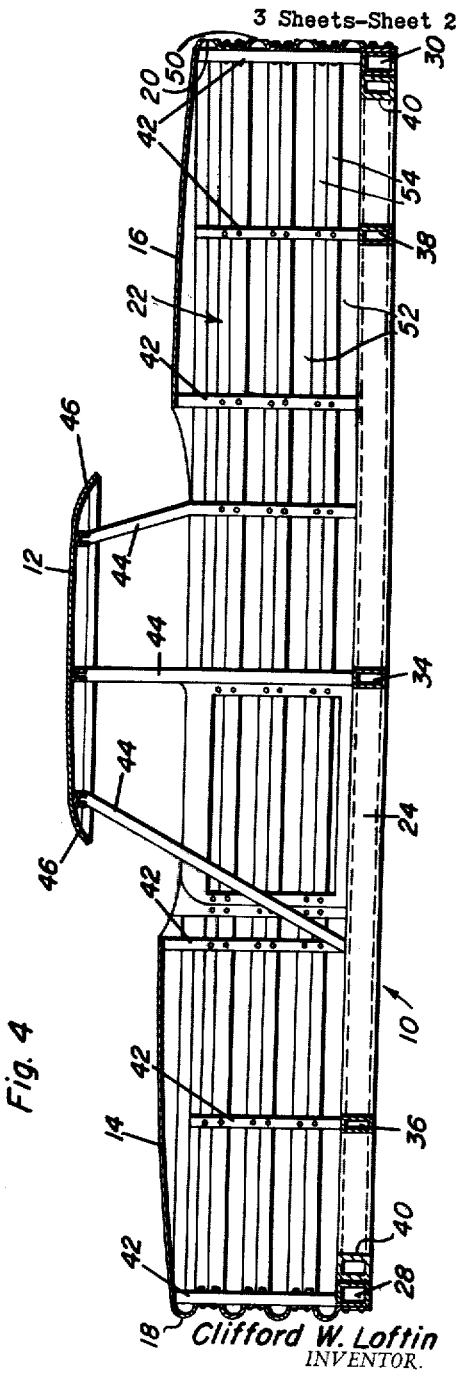

United States Patent Office 3,110,515
Patented Nov. 12, 1963

1

3,110,515
VEHICLE BODY-FENDER STRUCTURE
Clifford W. Loftin, 1466 Wells Ave., Newnan, Ga.
Filed Nov. 10, 1959, Ser. No. 852,093
9 Claims. (Cl. 293—62)

This invention comprises a novel and useful automobile safety construction and more particularly relates to a collision-resistant, reinforcement and safety construction to render automobiles less liable to damage and injury of their occupants in the event of collision or upsets of the vehicles.

The primary object of this invention is to provide a collision-resistant, body-fender safety construction which may be readily incorporated into the fabrication or applied to the bodies of automotive vehicles whereby to greatly increase their strength and resistance to damage by head-on collisions, side-swiping and rolling over of the vehicles.

More specifically, an important object of the invention is to greatly reinforce and strengthen the bodies of automotive vehicles and render the same much less prone to serious damage in the event of collisions or turning over of the vehicles by applying to all or selected portions of the front, rear and side walls of the vehicle a plurality of encircling tubular hollow reinforcing members which will both cushion and strengthen the body of the vehicle against collision.

A still further object of the invention is to provide a safety construction for automotive vehicles which shall include a greatly strengthened chassis or framework of such configuration as to deflect rather than absorb the shock of head-on impacts with stationary objects or other vehicles together with a surrounding wall structure for the vehicle of the same configuration as that of the chassis and which shall consist of a plurality of hollow individually collapsible members whereby to absorb and cushion the impact of the body with obstacles of various types.

A still further important object of the invention is to provide an automobile safety construction in accordance with the immediately preceding object in which the roof of the vehicle shall be secured to the chassis of the same in a greatly improved and strengthened manner whereby to protect the occupants of the vehicle in the event that the automobile is turned over.

These together with other objects and advantages which will become subsequently apparent reside in the details of construction and operation as more fully hereinafter described and claimed, reference being had to the accompany drawings forming a part hereof, wherein like numerals refer to like parts throughout, and in which:

FIGURE 1 is a top plan view of an automotive vehicle embodying therein the principles of the present invention;

FIGURE 2 is a side elevational view of the embodiment of FIGURE 1 and showing in particular the encircling collision proof side wall construction of the invention applied to the body of the vehicle;

FIGURE 3 is a bottom plan view of the closed frame of the chassis of the vehicle with the body and other portions of the vehicle being removed therefrom;

FIGURE 4 is a vertical longitudinal sectional view through the chassis and body of the vehicle along section-line 4—4 of FIGURE 1 showing in particular the manner

2 in which the top is rigidly secured to the chassis and in which the enclosing collision-resistant wall structure of the body is mounted upon the chassis;

FIGURE 5 is a view in vertical transverse section taken substantially upon the plane indicated by the section line 5—5 of FIGURE 1;

FIGURE 6 is an enlarged detail view of a portion of FIGURE 5 and showing in particular the structure and the manner by which the hollow longitudinal collision-resistant members are mounted upon vertical supports of the chassis of the vehicle; and FIGURE 7 is a fragmentary perspective view of one of the hollow reinforcing members of the invention.

The objects of the present invention are attained primarily by the provision of an improved chassis or frame construction of an automotive vehicle having such configuration and reinforcement as to enable it to deflect rather than absorb the vast majority of impacts applied thereto either from the front or sides thereof; together with a front, rear and side wall construction which encloses or constitutes the body of the vehicle and which throughout its extent is capable of locally absorbing impacts directed thereagainst without transmitting the same to the interior of the body.

A suitable embodiment in accordance with the principles of this invention is shown in the accompanying drawings in which the numeral 10 designates generally an automotive vehicle of any of the conventional styles to which the principles of this invention have been applied, the vehicle including a top 12 together with front and rear portions 14 and 16 respectively and further comprising a reinforcing wall construction consisting of rounded front and rear walls 18 and 20 together with side walls 22.

Although the reinforcing collision resistant and rear and side wall construction indicated at 18, 20 and 22 and to be hereinafter described in detail is applicable to various constructions of automobiles and their bodies, the principles of the invention are best attained by applying the same to the particular configuration of chassis or frame shown in FIGURE 3.

The chassis or frame which is preferred for carrying out the basic concept of this invention is an elongated closed frame consisting of hollow longitudinally extending side frame members each indicated by the numeral 24 and which at their mid-portions as at 26 are slightly angulated so that the enclosed frame is of greater width at its mid-portion than at its opposite extremities. At the front and rear ends the side frame members 24 are connected by arcuate end members 28 at the front end and 30 at the rear end of the vehicle. Greater strength and bracing is imparted to the chassis by a single hollow longitudial medially and centrally disposed frame member 32 whose opposite extremities are secured in any suitable manner to the front and rear frame members 28 and 30, and by means of a plurality of transverse brace members which may consist of a central brace member as at 34 securing the mid-portions 26 of the side frame members 24, and front and rear transverse members as at 36 and 38 respectively. Preferably, these members 36 and 38 are connected to the side frame members 24 at substantially the region at which the curved front and rear frame members 28 and 30 are merged therewith. Diagonal hollow brace members as at 40 are also provided by means of which the opposite ends of the transverse members 36 and 38 are secured to the ends of the central frame member 32. It will thus be seen that there is provided a rigid closed frame consisting of hollow members as will be apparent from a comparison of FIGURES 4 and 5 which is of a relatively greater width at its mid-portion and narrows and tapers toward its front and rear extremities and has smoothly curved front and rear ends. This particular configuration of the frame results in impacts applied to the front and rear ends thereof being deflected towards the sides, while side-swiping effects applied to the diverging front and rear portions of the frame will likewise tend to glance off so that the frame can readily shed the forces and impacts of collisions of the vehicle with stationary or moving objects.

By reference to FIGURE 4 and in conjunction with FIGURES 5 and 6 it will be observed that a plurality of vertical support angle members 42 are secured to and rise from the closed frame members 24, 28 and 30 at intervals along the periphery thereof. These supports constitute means for mounting the previously mentioned reinforcing structure of the front, rear and side walls 18, 20 and 22 to the chassis and the body of the vehicle. In addition, a plurality of rigid U-shaped standards as at 44 are likewise secured to the closed frame previously mentioned and also to certain of the vertical supports and rigidly support the top 12 and brace it in spaced relation to the chassis of the vehicle. It will be observed that the top structure itself about its periphery is provided with downwardly sloping surfaces as at 46, see also FIGURES 1 and 2, so that the top is rigidly supported whereby if the vehicle should be turned over the top will by the standards 44 support the weight of the body and thus prevent crushing of the body and injury to the occupants thereof. By this construction the vehicle may be readily turned over and rolled over as the result of a collision without serious damage to itself and its occupant. It should be here noted that if two vehicles of this configuration should meet head-on, it is almost certain that they will glance off each other and although they may be caused to roll over, there will be relative little damage to the vehicles and their occupants such as would occur with the conventional type of vehicle having the flat front surface.

Reference is now made particularly to FIGURES 2, 4 and 5 wherein it will be seen that the reinforcing wall structure applied to the front, rear and sides of the vehicle body at 18, 20 and 22 consists of a cushioning collision resistant wall structure which completely encloses the vehicle and extends from the chassis frame members 24, 28 and 30 vertically upwardly therefrom. The vehicle body may have the usual side wall skin. In other instances, the collision-proof reinforced construction of this invention may constitute the actual wall structure of the vehicle body. The reinforcing structure whether applied to the side wall skin or constituting the side wall of the vehicle body consists of a plurality of hollow elongated metallic members, each of which is designated generally by the numeral 50. From reference to FIGURE 7 it will be observed that each member 50 consists of a semi-cylindrical, outwardly protruding fender element comprising a central web portion 52 which at its opposite side edges is provided with opposed oppositely extending coplanar mounting flanges 54 which may be provided with apertures as at 56 for the reception of fastening bolts as at 58, see FIGURE 6, by which the members 50 may be removably secured to the supports 42 and the standards 44 of the framework of the automobile body. It will be observed that the webs 52 are outwardly convexed, that is project outwardly away from the supports 42 so as to provide hollow tubes, fenders or collision members. As shown in FIGURES 5 and 6 in particular, the reinforcing members 50 extend horizontally of the body of the vehicle and are disposed in vertically spaced adjacent positions with adjacent flanges 54 of adjacent members preferably abutting each other as shown in FIGURE 6. As illustrated in the arrangement of the drawings these reinforcing members extend in unbroken arrangement entirely about the front, rear and side walls of the vehicle body so as to completely enclose the same and protect the body against the effects of collision or impact from any direction. In some instance, however, it may be preferred to apply the collision resistant reinforcing construction afforded by the members 50 to selected portions only of a vehicle body.

It will be now understood that if the vehicle should be subjected to impact from any directions, the portion of the body receiving the impact will absorb the impact and the blow will be cushioned by the collapsing of the semi-cylindrical sections 52 which are subjected to the impact and thus permitting the transmission of the full impact to the body structure of the automobile.

By the present invention there is thus provided a reinforcing and a collision-resistant, body-fender construction which may be either fabricated into vehicle bodies during their construction at the factory or may be applied thereto subsequently as desired and which will greatly contribute towards deflection of head-on collisions from the body, as well as a cushioning of impacts from any direction whereby to greatly reinforce and strengthen the body, and minimize the danger of collisions therewith.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A collision-resistant automobile body-fender construction comprising
    (a) a plurality of horizontally elongated reinforcing members secured in vertically spaced, horizontal relation,
    (b) each of said elongated members including a pair of coplanar mounting flanges disposed in spaced side-by-side relation
    (c) and an outwardly protruding element disposed between and secured to said pair of flanges,
    (d) said protruding elements of said members constituting the fender of said body-fender construction.

2. The combination of claim 1 wherein said pair of flanges of each member consist of a single sheet of metal.

3. The combination of claim 1 wherein each elongated member consists of integral flanges and protruding element.

4. The combination of claim 1 wherein each elongated member consists of a metal sheet having integral flanges and element, said element being hollow for crushing under impact.

5. The combination of claim 1 wherein the adjacent mounting flanges of vertically adjacent members are in engagement.

6. The combination of claim 1 wherein said body-fender construction includes front, end and side walls, said side walls being convergent from their midportion towards said front and end walls and said front and end walls being bowed outwardly from each other from end-to-end whereby to reduce the possibility of and the damage from end-on impacts.

7. The combination of claim 1 wherein said elongated members are continuous and extend entirely about and surround said body-fender construction.

8. In a vehicle having a chassis and a reinforced, collision-resistant body-fender construction mounted thereon,
    (a) a plurality of vertically spaced, horizontally elongated hollow members, (b) each member comprising a pair of coplanar horizontally extending mounting flanges disposed in a spaced side-by-side relation,
(c) each member including a fender element secured to the adjacent edges of said pair of flanges and protruding outwardly from the plane of said flanges,
(d) the flanges of vertically adjacent members being engaged with each other.

9. The combination of claim 8 wherein said protruding fender elements comprise hollow webs joined to the adjacent edges of the associated pair of flanges.

References Cited in the file of this patent

UNITED STATES PATENTS

| | | |
|---|---|---|
| 154,327 | Fulk et al. | Aug. 25, 1874 |
| 1,252,558 | Edrington | Jan. 8, 1918 |
| 1,457,259 | Malluk et al. | May 29, 1923 |
| 1,706,162 | Howarth et al. | Mar. 19, 1929 |
| 1,744,871 | Dolbier | Jan. 28, 1930 |
| 1,754,112 | Lusse | Apr. 8, 1930 |
| 1,793,680 | Cooke | Feb. 24, 1931 |
| 2,084,694 | Martin | June 22, 1937 |
| 2,121,504 | Martin | June 21, 1938 |
| 2,232,275 | Ronning | Feb. 18, 1941 |
| 2,246,616 | Cherry | June 24, 1941 |
| 2,271,825 | Martin | Feb. 3, 1942 |
| 2,312,036 | Hextell | Feb. 23, 1943 |
| 2,312,052 | Premo | Feb. 23, 1943 |
| 2,354,700 | Pezzano | Aug. 1, 1944 |
| 2,626,180 | Thompson | Jan. 20, 1953 |
| 2,633,378 | Kraeft | Mar. 31, 1953 |
| 2,851,302 | Owen | Sept. 9, 1958 |
| 2,893,776 | Earl | July 7, 1959 |
| 2,897,004 | Skeens | July 28, 1959 |

FOREIGN PATENTS

| | | |
|---|---|---|
| 1,021,506 | France | Dec. 3, 1952 |

UNITED STATES PATENT OFFICE
CERTIFICATE OF CORRECTION

Patent No. 3,110,515                November 12, 1963

Clifford W. Loftin

It is hereby certified that error appears in the above numbered patent requiring correction and that the said Letters Patent should read as corrected below.

In the heading to the printed specification, line 3, for "1466 Wells Ave., Newnan, Ga." read -- Newnan, Ga. (1466 Wells Ave., Claremont, Calif.) --.

Signed and sealed this 28th day of April 1964.

(SEAL)
Attest:

ERNEST W. SWIDER

Attesting Officer

EDWARD J. BRENNER

Commissioner of Patents